United States Patent
Dey et al.

(10) Patent No.: US 9,930,045 B2
(45) Date of Patent: Mar. 27, 2018

(54) LOGGING SYSTEM FOR BLACKLISTING URLS IN TOLL-FREE DATA SERVICE

(71) Applicant: Verizon Patent and Licensing Inc., Arlington, VA (US)

(72) Inventors: Sayan Dey, Framingham, MA (US); Bongu Huma Shankar Rao, Waltham, MA (US); Jian Huang, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 138 days.

(21) Appl. No.: 15/161,639

(22) Filed: May 23, 2016

(65) Prior Publication Data

US 2017/0339154 A1 Nov. 23, 2017

(51) Int. Cl.
*H04L 29/06* (2006.01)
*G06F 17/30* (2006.01)
*H04L 29/08* (2006.01)

(52) U.S. Cl.
CPC ...... *H04L 63/101* (2013.01); *G06F 17/30887* (2013.01); *H04L 67/02* (2013.01)

(58) Field of Classification Search
None
See application file for complete search history.

(56) References Cited

U.S. PATENT DOCUMENTS

| 9,660,960 | B2* | 5/2017 | Phonsa | H04L 63/0263 |
| 2011/0177799 | A1* | 7/2011 | Ramer | G06Q 30/02 455/414.1 |
| 2012/0330750 | A1* | 12/2012 | Ramer | G06Q 30/02 705/14.53 |
| 2014/0053065 | A1* | 2/2014 | Yun | G06F 17/30905 715/238 |

* cited by examiner

*Primary Examiner* — Amir Mehrmanesh

(57) ABSTRACT

A method, a device, and a non-transitory storage medium that stores instructions to load a first web page; scan each embedded uniform resource locator (URL) of the first web page; select each embedded uniform resource locator (URL) that is signed to indicate support of a toll-free data service; transmit each signed embedded URL to a first network device; receive, from the first network device, at least one replacement URL; render the first web page using the at least one replacement URL; receive a user input via one of the at least one replacement URL; load a second web page in response to the user input; scan the second web page for an embedded URL; determine whether the second web page includes at least one unsigned embedded URL; and transmit to a second network device, blacklist data that includes the at least one unsigned embedded URL.

20 Claims, 14 Drawing Sheets

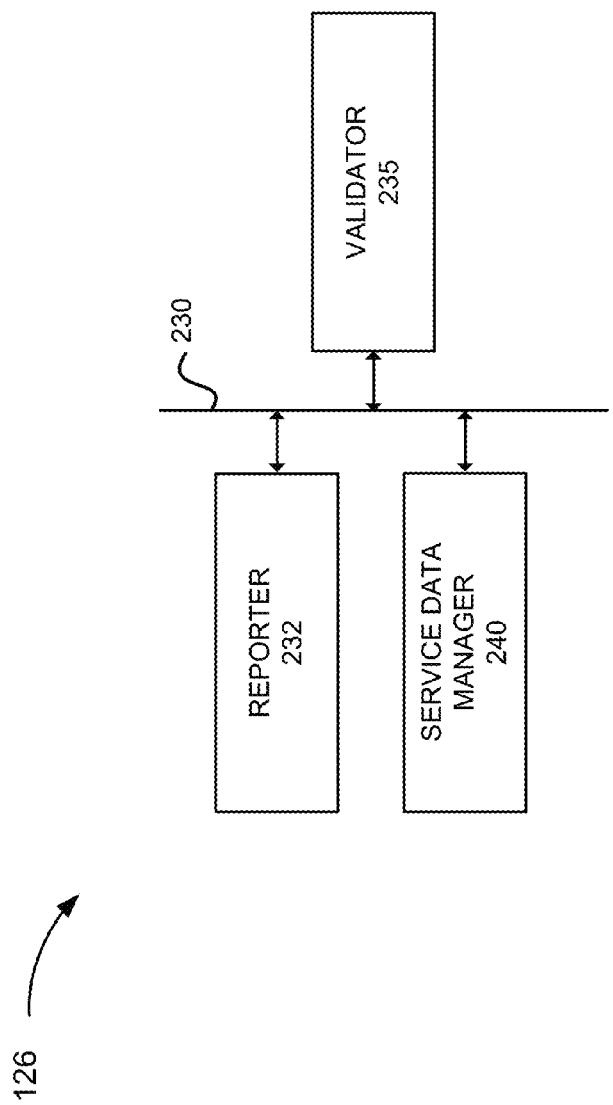

| TABLE 325 | | |
|---|---|---|
| IDENTIFIER | URL | INVESTIGATION |
| ••• | ••• | ••• |
| ↑ 330 | ↑ 335 | ↑ 340 |

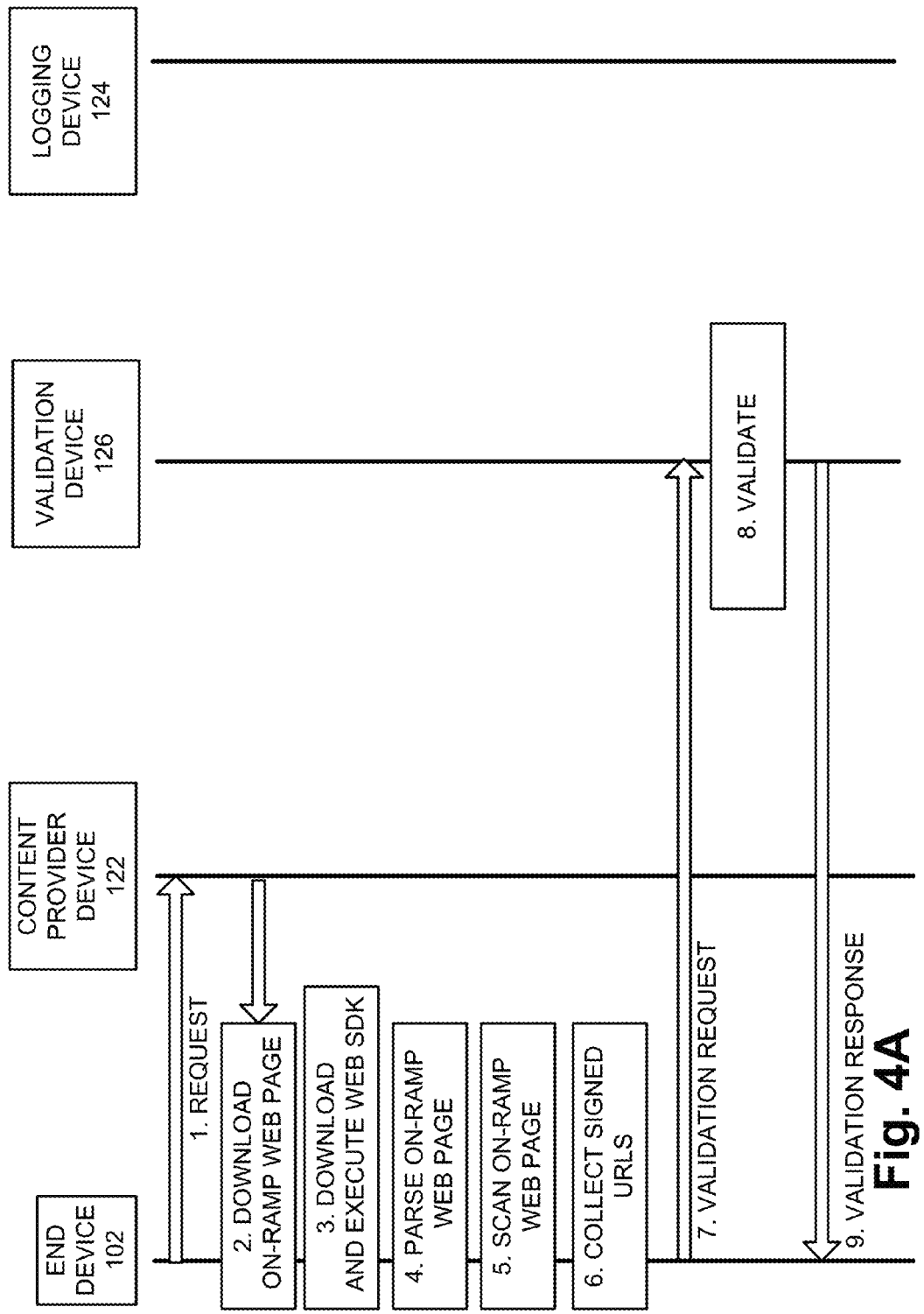

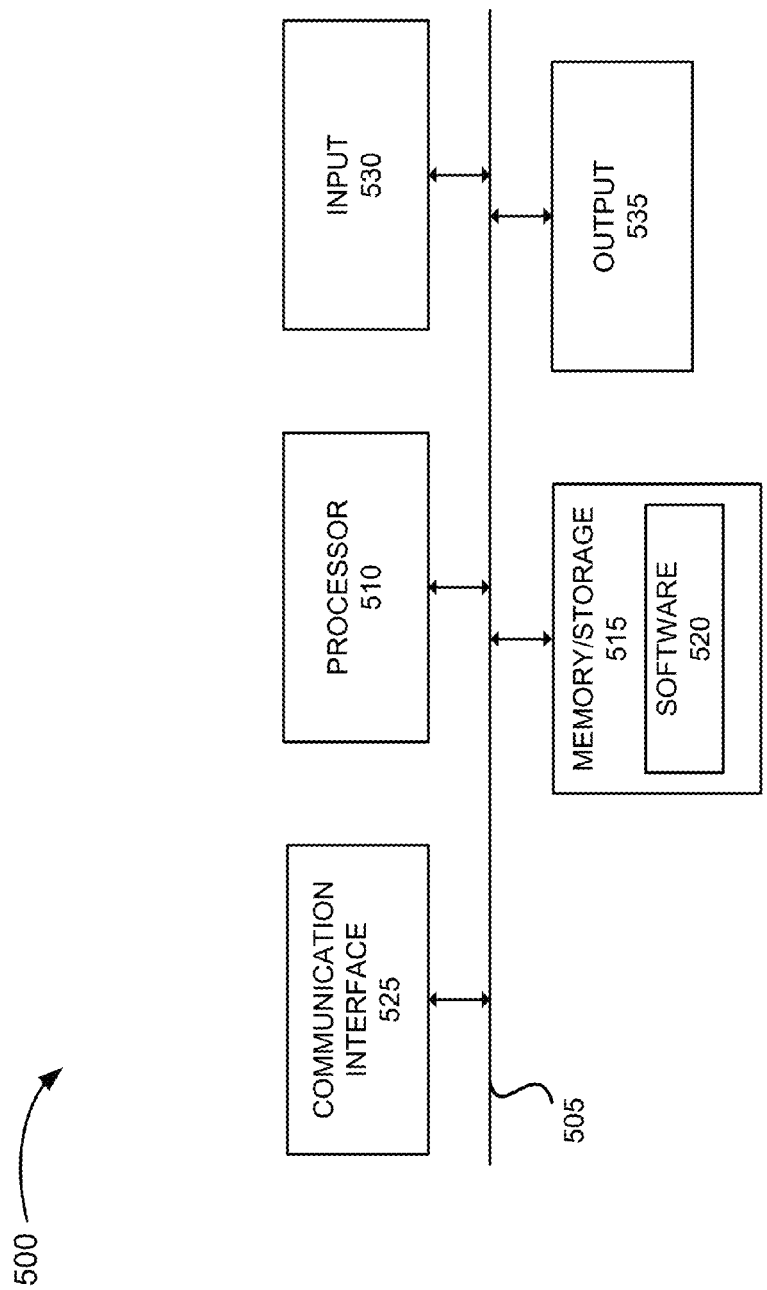

US 9,930,045 B2

LOGGING SYSTEM FOR BLACKLISTING URLS IN TOLL-FREE DATA SERVICE

BACKGROUND

An Internet Service Provider (ISP) or other entity may offer content to users in which data usage is not charged to the users. For example, a content provider may provide a toll-free data service to attract users to particular content.

BRIEF DESCRIPTION OF THE DRAWINGS

FIG. 2B is a diagram illustrating exemplary elements of an exemplary embodiment of the validation device depicted in FIG. 1;

FIG. 3B is a diagram illustrating exemplary blacklist data stored in a table of the logging device depicted in FIG. 1;

FIGS. 4A and 4B are diagrams illustrating an exemplary process of the logging service performed in the exemplary environment depicted in FIG. 1;

FIG. 5 is a diagram illustrating exemplary components of a device that may correspond to one or more of the devices illustrated depicted in FIG. 1.

DETAILED DESCRIPTION OF PREFERRED EMBODIMENTS

Figure 1:
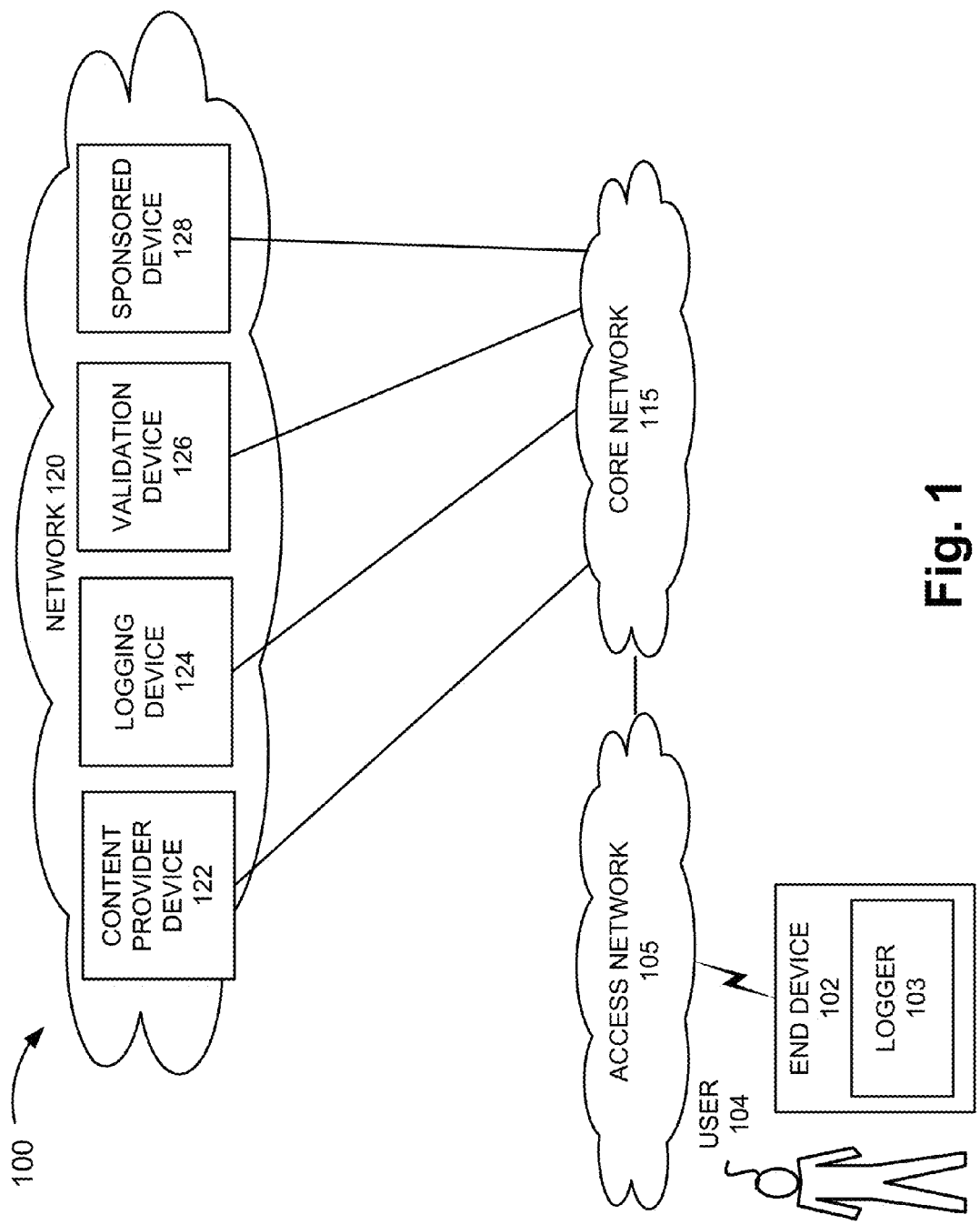
FIG. 1 is a diagram illustrating an exemplary environment in which an exemplary embodiment of a logging service may be implemented.

The following detailed description refers to the accompanying drawings. The same reference numbers in different drawings may identify the same or similar elements. Also, the following detailed description does not limit the invention.

The development and expansion of toll-free data services for users (e.g., mobile users, web users, etc.) continue. A third party entity or a content provider subsidizes the monetary cost accrued when data is exchanged between a user device and the content provider. The entity may have a relationship with another entity (e.g., a network provider, an ISP, etc.) that permits the automatic billing of the entity for the data usage. Thus, the data usage is effectively "toll-free" from the user's perspective.

When the user accesses content, which is associated with a toll-free data service, an application may scan the resources included in the content to determine whether all of the resources are supported by the toll-free data service. By way of further example, when the user visits a web page, the application may scan all hyperlink Uniform Resource Locators (URLs) included in the web page to determine whether each hyperlink URL is signed by an entity. For example, the hyperlink URL may include a string (e.g., alphanumeric, etc.) that represents a signature. When any of the resources are not signed, the application may determine that the hyperlink URL is not supported by the toll-free data service. In response to such a determination, the application may transmit a URL of the web page to a validation server for blacklisting of the web page in relation to the toll-free data service. Unfortunately, when the web page is blacklisted, the other entity does not receive or is not notified of the URL of the blacklisted web page. Additionally, the other entity is unable to find out why the hyperlink URL is not signed by the entity. As a result, users associated with the other entity may be dissatisfied with the services of the other entity and/or the entity associated with the toll-free data service. For example, users may complain that content that was supposed to be free of charge has been charged to their accounts.

According to an exemplary embodiment, a logging service is described. According to an exemplary embodiment, a component of an end device provides the logging service. According to an exemplary embodiment, based on the scanning of content, the component logs or stores each resource included in the content that is determined to not be supported by a toll-free data service. According to an exemplary implementation, when the content is a web page, the component determines whether each resource (e.g., hyperlink URL) included in the web page, when present, is signed or includes some other form of data indicating the resource is supported by the toll-free data service. According to an exemplary embodiment, the component generates a message in response to determining that one or more resources are not supported by the toll-free data service. According to an exemplary implementation, the message includes blacklist data. For example, the blacklist data may include a log identifier, a URL of the resource that is not supported by the toll-free data service, and a URL of the web page. According to one example, the message may be implemented as a Hypertext Transfer Protocol (HTTP) POST message or an HTTP Secure (HTTPS) POST message. According to another example, the message may be implemented based on another type of application layer protocol and/or message type. According to an exemplary embodiment, the component transmits the message to another network device. According to an exemplary implementation, the component transmits the message to a logging server. In response to receiving the message, the network device stores the message. According to an exemplary embodiment, the message is analyzed and investigative measures are performed to identify, confirm, and/or correct the issue surrounding the blacklisted hyperlink URL and/or the blacklisted web page.

FIG. 1 is a diagram illustrating an exemplary environment 100 in which an exemplary embodiment of a logging service may be implemented. As illustrated, environment 100 includes an access network 105, a core network 115, and a network 120. As illustrated, network 120 includes a content provider device 122, a logging device 124, a validation device 126, and a sponsored device 128. Environment 100 further includes an end device 102 and a user 104. End device 102 includes a logger 103. According to other embodiments, environment 100 may include additional network devices, fewer network devices, and/or different network devices. According to other embodiments, environment 100 may include additional networks, fewer networks, and/or different types of networks.

Environment 100 includes links between the networks, network devices, and end device 102 and access network 105, and so forth. Environment 100 may be implemented to include wireless and wired (e.g., electrical, optical, etc.) links. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device). The number of network devices, the number of end devices, the number of networks, and the arrangement in environment 100 are exemplary.

End device 102 includes a device that has computational and wireless communicative capabilities. End device 102 may be implemented as a mobile device, a portable device, or other type of end user device. For example, end device 102 may be implemented as a smartphone, a personal digital assistant, a tablet, a netbook, a phablet, an infotainment system in a vehicle, a wearable device (e.g., a watch, glasses, etc.), a computer (e.g., a desktop, a laptop, a palmtop, etc.), a gaming device, or other type of device that can access and use the Web. Alternatively, for example, end device 102 may be implemented as a set top box, a smart television, or other type of device that can access the Internet. End device 102 includes software that enables user 104 to access content provider 122. For example, the software may be implemented as a web browser or some other type of application (e.g., a client of the content provider or a third party). According to an exemplary embodiment, end device 102 includes logger 103. Logger 103 provides a logging service. Logger 103 is described further below. User 104 is a person that operates end device 102.

According to an exemplary embodiment, when user 104 wishes to access sponsored content that is toll-free, end device 102 downloads logger 103. For example, user 104 accesses a web page of content provider device 122 via a web browser. The web page includes an element in the web page that causes the web browser to download logger 103. Simply for the sake of reference, the web page may be considered an on-ramp web page to the sponsored web page. According to an exemplary implementation, the on-ramp web page includes a HyperText Markup Language (HTML) element that facilitates the downloading of logger 103 via the web browser. By way of the example, the HTML element may be implemented as an HTML Head Element. The HTML element may include, for example, an "include" statement, an "import" statement, and/or another type of statement included in the HTML code of the on-ramp web page to invoke the downloading of logger 103 via the web browser. The HTML element may further include a URL that indicates a location from which the web browser can download logger 103. For example, the URL of logger 103 may be resident on content provider device 122 or another network device not illustrated in FIG. 1 (e.g., a network device of an ISP, etc.). Based on the presence of the HTML element within the on-ramp web page (e.g., in the HTML coding), the web browser of end device 102 downloads logger 103. Subsequent to the downloading of logger 103, logger 103 operates or executes on end device 102. The on-ramp web page may include one or multiple signed hyperlink URLs, which when user 104 interacts with (e.g., clicks on) the signed hyperlink URL, user 104 may navigate to a sponsored web page. The on-ramp page may include unsigned hyperlink URLs.

According to an exemplary embodiment, when user 104 clicks on the signed hyperlink URL of the on-ramp page that has been validated by validation device 126 (e.g., determined that the toll-free data service is active for the content to be accessed via the signed hyperlink URL), user 104 may navigate to another web page. For the sake of reference, this web page is termed a "sponsored web page." According to an exemplary implementation, the sponsored web page may include one or multiple hyperlink URLs. Additionally, each hyperlink URL is supposed to be signed and active for toll-free data service. User 104 may continue to navigate within sponsored web pages without incurring data usage charges. However, as described herein, there are instances when a hyperlink URL within a sponsored web page is not signed. Logger 103 identifies such a hyperlink URL and provides the blacklist data to logging device 124, as described herein.

Access network 105 includes one or multiple networks of one or multiple types. For example, access network 105 may be implemented to include a terrestrial network and/or a satellite network. According to an exemplary implementation, access network 105 includes a radio access network (RAN). For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of a Long Term Evolution (LTE) network or LTE-Advanced (LTE-A) network, a U-TRAN, a Universal Mobile Telecommunications System (UMTS) RAN, a Global System for Mobile Communications (GSM) RAN, a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.). Access network 105 may also include other types of networks, such as a WiFi network, a WiMAX network, a local area network (LAN), a personal area network (PAN), or other type of network that provides access to or can be used as an on-ramp to network 120.

Core network 115 includes one or multiple networks of one or multiple types. For example, core network 115 may be implemented to include a terrestrial network and/or a satellite network. According to an exemplary implementation, core network 115 includes a complimentary network pertaining to the one or multiple RANs described. For example, core network 115 may include the core part of an LTE network, an LTE-A network, a CDMA network, a GSM network, and so forth. Depending on the implementation, core network 115 may include various network elements, such as a gateway, a support node, a serving node, a mobility management entity (MME), a router, a switch, a bridge, as well other network elements pertaining to various network-related functions, such as billing, security, authentication and authorization, network polices, subscriber profiles, and/or other network elements that facilitate the operation of core network 115.

Network 120 includes one or multiple networks of one or multiple types. For example, network 120 may include the Internet, the World Wide Web, a wide area network (WAN), a metropolitan area network (MAN), a service provider network, a private Internet Protocol (IP) network, or some other type of network that is external to core network 115 and/or access network 105.

Content provider device 122 includes a network device that stores or makes available content. For example, content provider device 122 may be implemented as a web server, a streaming server, a file server, an origin server, a storage server, or other type of computational and communicative device that hosts or provides access to content. The term "content," as used herein, is intended to be interpreted as a resource. For example, content may be implemented as audio data, video data, audio and video data, text, an image, graphics, multimedia content, media, or some other type of asset or digital data representing human interpretable information. According to an exemplary implementation, the content may be presented to a user in the form of a web page. The content stored at or made available to user 104 by content provider device 122 includes sponsored content. The phrase "sponsored content" or "sponsored web page," as used herein, is intended to be interpreted as content that is toll-free, in terms of billing (e.g., data usage), from user's 104 perspective. For example, sponsored content is supported by a toll-free data service and is active for that content. Content provider device 122 is described further below.

Logging device 124 includes a network device that provides the logging service. For example, logging device 124 may be implemented as a computational and communicative device, such as a computer. The computer may be a carrier-grade computer or system. Logging device 124 includes logic that obtains a message (e.g., a log or a report) from logger 103 of end device 102. The message includes blacklist data. The blacklist data includes data that indicates a hyperlink URL, which is included in sponsored content but is not supported by the toll-free data service. For example, the hyperlink URL may not be signed, which indicates that the URL is not supported by the toll-free data service. Logging device 124 includes logic that stores the blacklist data. Logging device 124 includes logic that provides the blacklist data to sponsored device 128, which may serve as a notification to an entity sponsoring the toll-free data service that the URL is not supported by the toll-free data service because the URL is not signed. Logging device 124 is further described herein.

Validation device 126 includes a network device that provides a validation service. For example, validation device 126 may be implemented as a computational and communicative device, such as a computer. The computer may be a carrier-grade computer or system. Validation device 126 includes logic that obtains signed URL data from logger 103. For example, the signed URL data includes a signed hyperlink URL of the on-ramp web page. Validation device 126 includes logic that analyzes the signed URL data to determine whether to validate the signed URL data. For example, validation device 126 determines whether the signed URL of a hyperlink is currently active for the toll-free data service. Validation device 126 may consider various parameters in determining whether the signed URL is currently active for the toll-free data service. For example, the various parameters may be specified by the entity that supports the toll-free data service. By way of further example, the various parameters may include the particular day of user access (e.g., Monday, Tuesday, etc.), the time of user access (e.g., 9:15 a.m., 10:00 p.m., etc), a balance of funds (e.g., $5,000.00, $10,000.00, etc.) supporting the toll-free data service that is associated with the signed URL, and/or another configurable parameter that may govern when the toll-free data service is active or not active for the signed URL and/or the content to which the signed URL points.

When validation device 126 determines that a signed hyperlink URL is currently active for the toll-free data service, validation device 126 may select a replacement URL (e.g., a sponsored URL) that can be used to access the content under a toll-free data service. When validation device 126 determines that a signed hyperlink URL is not currently active for the toll-free data service, validation device 126 omits such a selection. Validation device 126 includes logic that generates a message subsequent to the URL data analysis. The message includes the replacement URL data. Validation device 126 transmits the message to logger 103. Validation device 126 is described further below.

Sponsored device 128 includes a network device that that provides a verification service. For example, sponsored device 128 may be implemented as a computational and communicative device, such as a computer. The computer may be a carrier-grade computer or system. Sponsored device 128 includes logic that obtains blacklist data from logger 103. Sponsored device 128 includes logic that identifies, confirms, and/or corrects the issue surrounding the blacklist data or passes the blacklist data to other backend systems of the entity that sponsors the content for the toll-free data service so that some form of resolution takes place. Sponsored device 128 includes logic to generate and transmit a message that includes data that indicates the result of an investigation surrounding the issue. Sponsored device 128 is described further below.

Figure 2A:
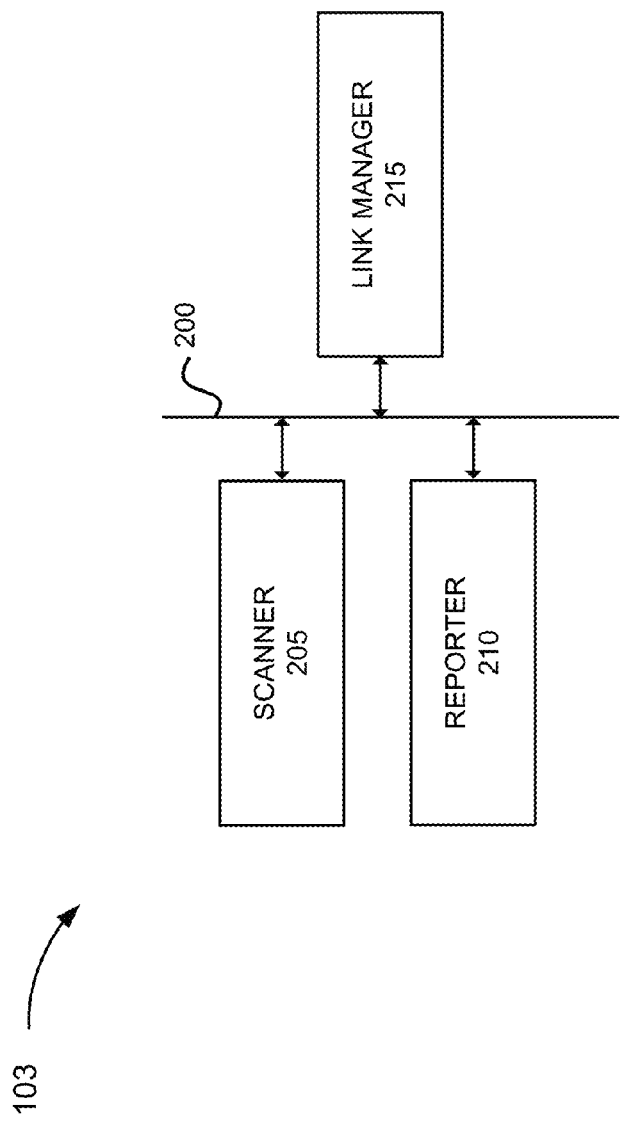
FIG. 2A is a diagram illustrating exemplary elements of an exemplary embodiment of the logger of end device depicted in FIG. 1.

FIG. 2A is a diagram illustrating exemplary elements of an exemplary embodiment of logger 103. Logger 103 may be implemented as a Web software development kit (SDK). For example, the Web SDK may include JavaScript, a Cascading Style Sheets (CSS) file, and other files (e.g., image file, etc.) that provide or support a logging service. Referring to FIG. 2A, logger 103 includes a scanner 205, a reporter 210, a link manager 215, and a data manager 220. According to other exemplary embodiments, logger 103 may include additional, fewer, and/or different elements than those illustrated in FIG. 2A and described herein. Additionally, multiple elements may be combined into a single element and/or a single element may be implemented as multiple elements in which a process or a function may be collaboratively performed or multiple processes or functions may be split between them.

Link 200 provides a communicative link between two or more elements. Link 200 may be implemented as a hardware link (e.g., a bus, a shared memory space, etc.) or a software link (e.g., inter-process communication (IPC), etc.).

Scanner 205 includes logic that identifies each hyperlink URL within a web page. For example, scanner 205 may include a scraping and/or parsing function to identify each hyperlink URL. Scanner 205 includes logic to determine for each hyperlink URL whether the hyperlink URL is signed. For example, scanner 205 determines whether the hyperlink URL is signed based on the presence or the absence of a particular string in the URL of the hyperlink. The string may include a specific sequence of letters, numbers, and/or symbols. For example, scanner 205 may store the string (e.g., a signature) and compare the stored string to a portion of the hyperlink URL. Based on a result of the comparison, scanner 205 determines whether the hyperlink URL is signed or not. Scanner 205 may store the results of the comparison.

Scanner 205 includes logic to identify a hyperlink URL and determine whether the hyperlink URL is signed or not for particular web pages. For example, for the on-ramp web page, scanner 205 includes logic that identifies each hyperlink URL that is determined to be signed. Scanner 205 may include logic that identifies the on-ramp web page. For example, scanner 205 may identify the on-ramp web page based on the presence of the HTML element described herein. Additionally, or alternatively, during the loading or parsing of the on-ramp web page via the web browser, logger 103 may be concurrently executing. During execution of logger 103 and in response to the loading or parsing of the on-ramp web page, scanner 205 may scan the on-ramp web page to identify each hyperlink URL and determine whether the hyperlink URL is signed. The content provider or the entity that is sponsoring the toll-free data service may configure which hyperlink URLs are to be signed and which hyperlink URLs are not to be signed. Scanner 205 includes logic that collects and stores each signed hyperlink URL of the on-ramp web page. Scanner 205 provides the collection of signed hyperlink URLs to reporter 210. For a sponsored web page, scanner 205 includes logic that identifies each hyperlink URL that is determined to not be signed. Scanner 205 may identify the sponsored web page based on the user's 104 interaction with the on-ramp web page (e.g., selection of a replacement URL) and other subsequent interactions (e.g., selection of signed hyperlink URLs).

Reporter 210 includes logic that transmits and receives messages pertaining to the logging service. Reporter 210 includes logic that obtains one or multiple signed hyperlink URLs of the on-ramp web page determined to be signed by scanner 205. Reporter 210 generates a message that includes the collection of signed hyperlink URLs and transmits the message to validation device 126. For example, the message may include a request to validate the collection of signed hyperlink URLs. Reporter 210 includes logic that receives a message from validation device 126 that is responsive to the transmitted request message. The response message includes a replacement hyperlink URL for each signed hyperlink URL that has been validated.

Reporter 210 includes logic that obtains one or multiple hyperlink URLs of a sponsored web page determined to be unsigned by scanner 205. Reporter 210 generates a message that includes the collection of unsigned hyperlink URLs and transmits the message to logging device 124. For example, the message may include a request to blacklist the web page. According to an exemplary implementation, the message includes a log identifier, one or multiple unsigned hyperlink URLs, and a URL of the sponsored web page within which the unsigned hyperlink URL is included. The log identifier may be a unique string and may serve as a record identifier pertaining to user's 104 session or access of the sponsored web page. Reporter 210 may generate the log identifier. According to other exemplary implementations, the message may include additional, fewer, and/or different instances of data. For example, the message may include a date and a timestamp of the access to the sponsored web page, an entity identifier indicating the identity of the sponsor, etc. Alternatively, the message may not include the log identifier.

Link manager 215 includes logic that obtains replacement hyperlinks received from validation device 126. Link manager 215 includes logic to replace a hyperlink URL, for presentment to user 104, with the replacement hyperlink URL in the on-ramp web page. For example, when the on-ramp web page is downloaded and rendered within the web browser of end device 102, link manager 215 replaces hyperlink URLs originally included within the on-ramp web page with their corresponding replacement hyperlink URLs that are supported by the toll-free data service and are active.

Link manager 215 includes logic that causes an image or other element that indicates to user 104 that the replacement hyperlink URL is supported by the toll-free data service and is active. For example, the image may be implemented as a Freebee icon that indicates that data usage is toll-free when accessing the content via the replacement hyperlink URL. The image may appear sufficiently near the replacement hyperlink URL to give notice to user 104. Additionally, for hyperlink URLs originally included in the on-ramp web page but that do not have corresponding replacement hyperlink URLs (e.g., were not signed, validated, etc.), link manager 215 maintains those hyperlink URLs as originally included within the on-ramp web page.

FIG. 2B is a diagram illustrating exemplary elements of an exemplary embodiment of validation device 126. Referring to FIG. 2B, validation device 126 includes a reporter 232, a validator 235, and a service data manager 240. According to other exemplary embodiments, validation device 126 may include additional, fewer, and/or different elements than those illustrated in FIG. 2B and described herein. Additionally, multiple elements may be combined into a single element and/or a single element may be implemented as multiple elements in which a process or a function may be collaboratively performed or multiple processes or functions may be split between them.

Link 230 provides a communicative link between two or more elements. Link 230 may be implemented as a hardware link (e.g., a bus, a shared memory space, etc.) or a software link (e.g., inter-process communication (IPC), etc.). Reporter 232 includes logic that transmits and receives messages pertaining to the logging service. Reporter 232 includes logic that receives a request message from logger 103 to validate a signed hyperlink URL. Reporter 232 stores and makes available the request message to validator 235. Reporter 232 includes logic that generates and transmits a response message to logger 103. The response message includes a replacement hyperlink URL for each signed hyperlink URL that has been validated.

Validator 235 includes logic that determines whether signed URLs are valid. For example, validator 235 obtains a signed hyperlink URL received by reporter 232 and determines whether the toll-free data service associated with the signed URL and/or content to which the signed URL points is currently active. Validator 235 uses the service data stored by service data manager 240 to determine whether a toll-free data service is currently active for the signed URL/content.

Service data manager 240 includes logic that stores and updates service data. According to an exemplary embodiment, service data manager 240 includes a database management system (DBMS). The DBMS may be implemented using conventional, well-known, or commercially available relational (e.g., structured query language (SQL)) or NoSQL software/packages (e.g., Microsoft SQL, Oracle Database, Cassandra, MongoDB, etc.). Service data manager 240 includes a storage device that stores a database. The database stores service data. According to an exemplary embodiment, the service data includes data indicating parameters when the toll-free data service is active for a signed URL, a sponsored page, and/or other grouping of sponsored content. Service data manager 240 includes logic that provides an interface to a user (e.g., an administrator) to store, update, delete, etc., the service data. The database may store the service data in various types of data structures, an example of which is described below.

Figure 3A:
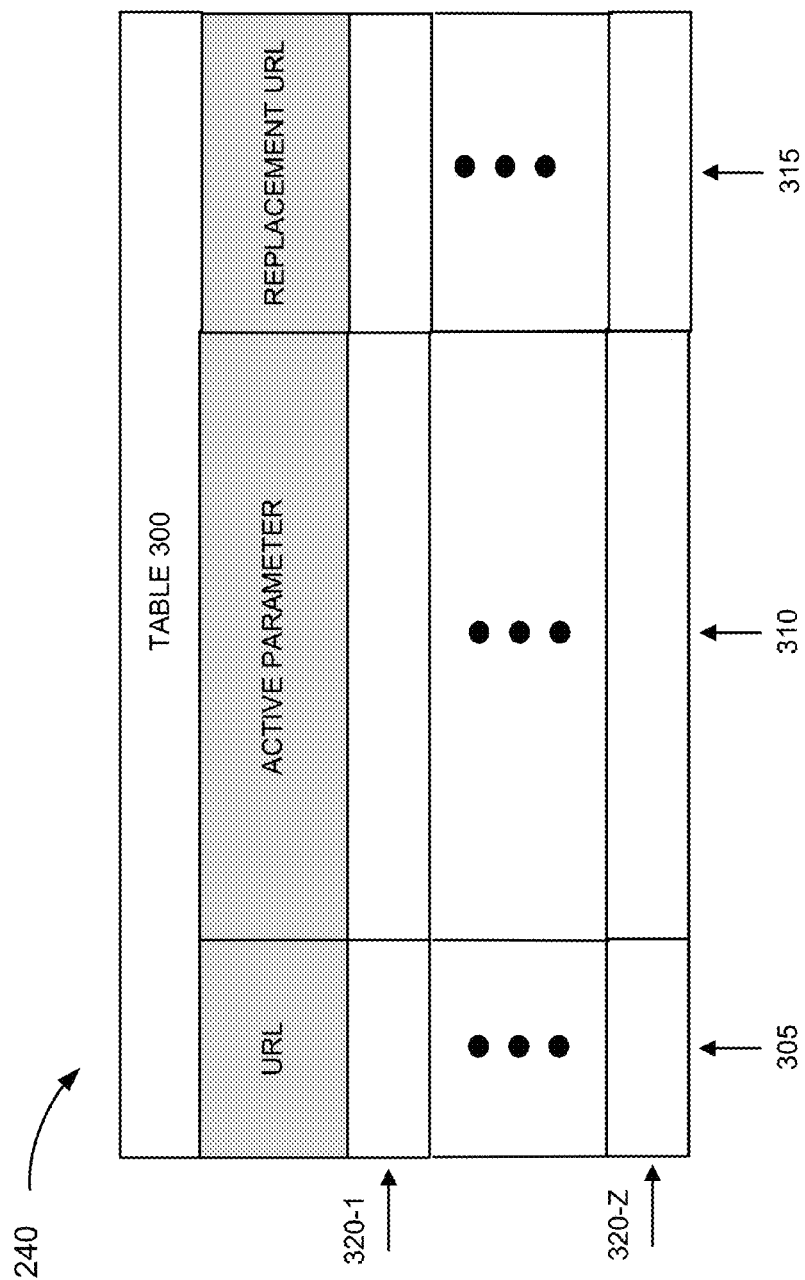
FIG. 3A is a diagram illustrating exemplary service data stored in a table of the validation device depicted in FIG. 1.

FIG. 3A is a diagram that illustrates exemplary types of service data that may be stored in a table 300. As illustrated, table 300 includes a URL field 305, an active parameter field 310, and a replacement URL field 315. As further illustrated, table 300 includes profiles 320-1 through 320-Z (also referred to as profiles 320 and, individually and generically as profile 320). Each profile 320 includes a grouping of data fields 305, 310, and 315. Each profile 320 includes at least one instance of service data that is different from another profile 320. According to other implementations, table 300 may store additional instances of service data, fewer instances of service data, and/or different types of service data.

URL field 305 stores signed URLs that support a toll-free data service sponsored by an entity. The signed URL may be hosted by content provider device 122. Active parameter field 310 stores parameters that indicate when the toll-free data service is active for the signed URL stored in URL field 305. For example, the parameters may include a particular day, a week, a month, etc., a time within the day, the week, the month, a monetary number representing the budget allocated to the toll-free data service, a current balance of the budget, and/or another configurable parameter that may govern when the toll-free data service is active or not active for the signed URL and/or the content to which the signed URL points.

Replacement URL field stores replacement signed URLs. The replacement signed URL is the URL that is supported by the toll-free data service and is active such that user 104 will not be billed for data usage when accessing sponsored content via the replacement signed URL.

Referring back to FIG. 2B, validator 235 uses the service data to determine whether the toll-free data service is active for the signed URL. For example, validator 235 includes logic to apply the active parameters stored in active parameter field 310 to determine whether certain criteria has been satisfied or met, such as day, time, threshold budget remaining, a length of time of the toll-free data service (e.g., runs for 1 week, a start date and an end date, etc.), etc. When validator 235 determines that the parameters for a signed URL have been met (i.e., meaning that the signed URL is validated), validator 235 may select the replacement signed URL of replacement URL field 315. When validator 235 determines that the parameters for the signed URL have not been met, validator 235 determines that the signed URL cannot be validated. Validator 235 may store the replacement URLs stemming from the validation process. Reporter 232 may use the replacement URLs when generating and transmitting a response message to logger 103.

Figure 2C:
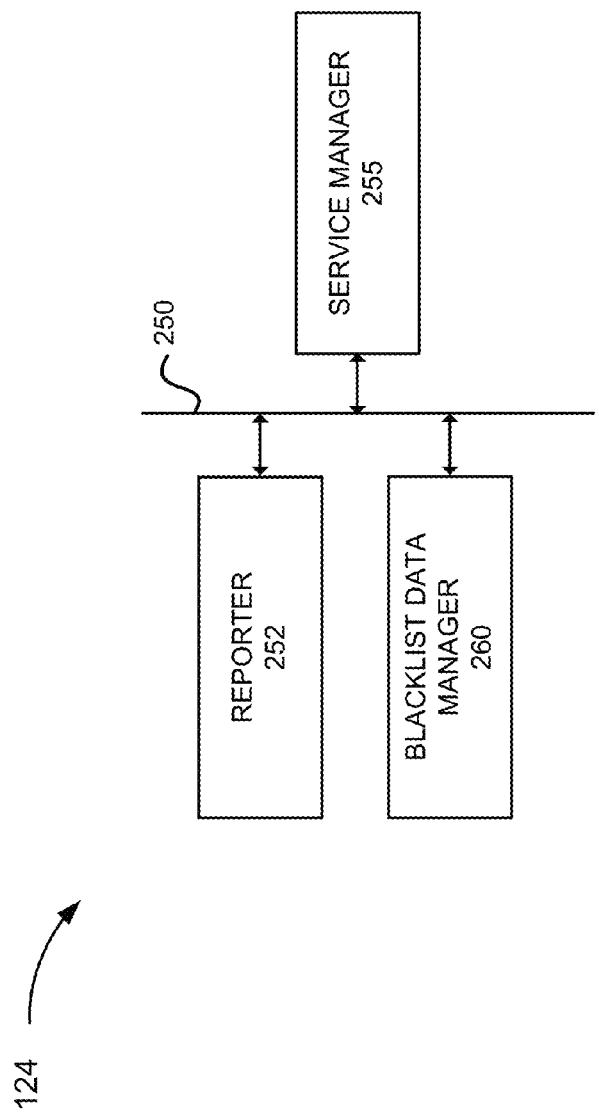
FIG. 2C is a diagram illustrating exemplary elements of an exemplary embodiment of the logging device depicted in FIG. 1.

FIG. 2C is a diagram illustrating exemplary elements of an exemplary embodiment of logging device 124. Referring to FIG. 2C, logging device 124 includes a reporter 252, a service manager 255, and a blacklist data manager 260. According to other exemplary embodiments, logging device 124 may include additional, fewer, and/or different elements than those illustrated in FIG. 2C and described herein. Additionally, multiple elements may be combined into a single element and/or a single element may be implemented as multiple elements in which a process or a function may be collaboratively performed or multiple processes or functions may be split between them.

Link 250 provides a communicative link between two or more elements. Link 250 may be implemented as a hardware link (e.g., a bus, a shared memory space, etc.) or a software link (e.g., inter-process communication (IPC), etc.). Reporter 252 includes logic that transmits and receives messages pertaining to the logging service. Reporter 252 includes logic that receives a message from logger 103 that includes blacklist data. For example, as previously described, the blacklist data may include a log identifier, one or multiple unsigned hyperlink URLs, and a URL of the sponsored web page within which the unsigned hyperlink URL is included.

Service manager 255 includes logic that stores the blacklist data, which is received by reporter 252, in blacklist data manager 260. Service manager 255 includes logic that identifies an entity that sponsors the toll-free data service pertaining to unsigned URLs. Service manager 255 selects sponsored device 128 associated with the entity. Reporter 252 generates and transmits a request message, which includes the blacklist data, to sponsored device 128. Reporter 252 includes logic to receive a response message from sponsored device 128. Service manager 255 includes logic to analyze the response message. For example, service manager 255 may determine whether the response message indicates that the unsigned URL has been corrected or is confirmed to remain unsigned. Service manager 255 may cause reporter 252 to transmit various backend systems based on the analysis. For example, reporter 252 may generate and transmit a message to a billing system, a customer service center, and/or a network administrator.

Blacklist data manager 260 includes logic that stores and updates blacklist data. According to an exemplary embodiment, blacklist data manager 260 includes a DBMS. The DBMS may be implemented using conventional, well-known, or commercially available relational or NoSQL software/packages. Blacklist data manager 260 includes a storage device that stores a database. The database stores the blacklist data. According to an exemplary embodiment, the blacklist data includes the log identifier, the unsigned URL link, and the URL of the sponsored web page. The blacklist data may include other instances of data, such as a sponsor identifier and data indicating the outcome of an investigation. For example, the data may indicate whether the unsigned URL has been confirmed as unsigned by the sponsor or has been corrected. Blacklist data manager 260 includes logic that provides an interface to a user (e.g., an administrator) to store, update, delete, etc., the blacklist data. The database may store the blacklist data in various types of data structures, an example of which is described below.

FIG. 3B is a diagram that illustrates exemplary types of blacklist data that may be stored in a table 325. As illustrated, table 325 includes an identifier field 330, a URL field 335, and an investigation field 340. As further illustrated, table 325 includes profiles 350-1 through 350-Z (also referred to as profiles 350 and, individually and generically as profile 350). Each profile 350 includes a grouping of data fields 330 through 340. Each profile 350 includes at least one instance of blacklist data that is different from another profile 350. According to other implementations, table 325 may store additional instances of blacklist data, fewer instances of blacklist data, and/or different types of blacklist data.

Identifier field 330 stores one or multiple unique identifiers. For example, identifier field 330 stores an entity identifier that identifies a content provider and/or a sponsor of the toll-free data service for a particular content. Identifier field 330 may also store the log identifier. URL field 335 stores an unsigned URL. URL field 335 may store the URL of the sponsored web page within which the unsigned URL is included. Investigation field 340 stores data pertaining to the investigation of the unsigned URL of the sponsored web page. For example, investigation field 340 may store data indicating whether the unsigned URL/sponsored content is confirmed to be unsigned or has been corrected to now be signed.

Figure 4B:
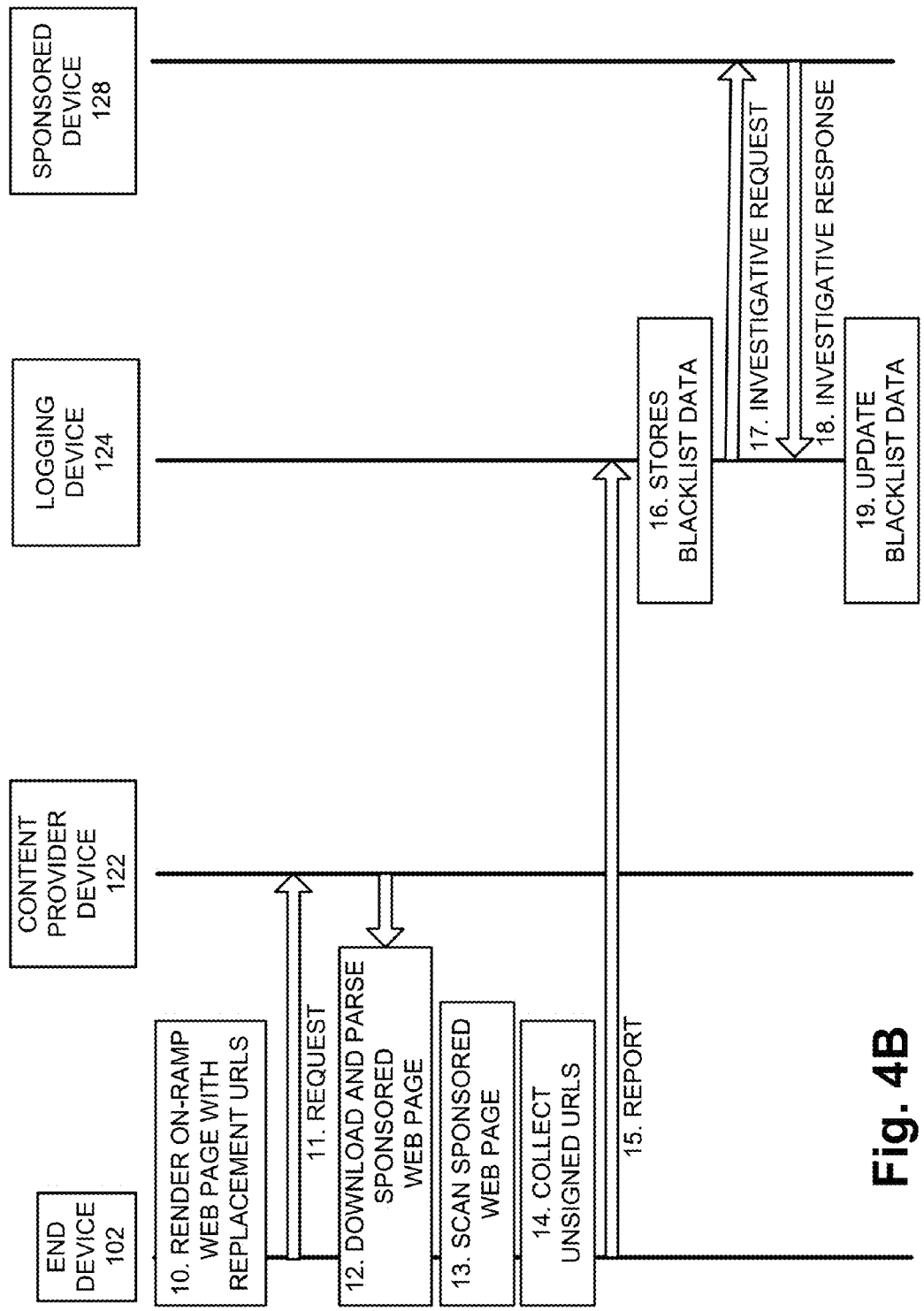

FIGS. 4A and 4B are a diagram illustrating an exemplary process of the dynamic toll-free data service performed in environment 100. As illustrated in FIG. 4A, in step 1, user 104 via end device 102 and a web browser communicates with content provider device 122. User 104 navigates to an on-ramp web page causing an HTTP request to be transmitted via end device 102 to content provider device 122. In step 2, based on the HTTP request, end device 102 via the web browser begins downloading the on-ramp web page. In step 3, end device 102 also begins downloading logger 103 (e.g., a Web SDK). Upon completion of the download of logger 103, logger 103 executes. In step 4, the web browser parses or loads the on-ramp web page for rendering. In step 5, in response to the parsing or loading of the on-ramp web page, logger 103 scans the on-ramp web page for any signed URLs (e.g., signed hyperlink URLs). In step 6, logger 103 collects and stores all of the signed URLs included in the on-ramp web page. In step 7, logger 103 generates and transmits a validation request to validation device 126. The validation request includes signed URL data. In step 8, in response to receiving the validation request message, validation device 126 validates each of the signed URLs. For example, validation device 126 determines whether to validate a signed URL based on parameters that are associated with the toll-free data service and indicate when the toll-free data service is active for the signed URL/sponsored content. Validation device 126 selects a replacement URL for each signed URL that is validated. Validation device 126 does not select a replacement URL for each signed URL that is not validated. In step 9, in response to the completion of the validation process, validation device 126 generates and transmits a validation response to end device 102. The validation response includes the replacement URLs.

Referring to FIG. 4B, in response to receiving the replacement URLs, logger 103 renders the on-ramp web page. During the rendering of the on-ramp web page, logger 103 replaces any signed URLs with their corresponding replacement URLs. Additionally, for example, logger 103 inserts an image (e.g., a Freebee icon) proximate to the replacement URLs. In this way, user 104 may recognize that the URL (e.g., the hyperlink URL) is supported by the toll-free data service and is currently active.

Figure 4C:
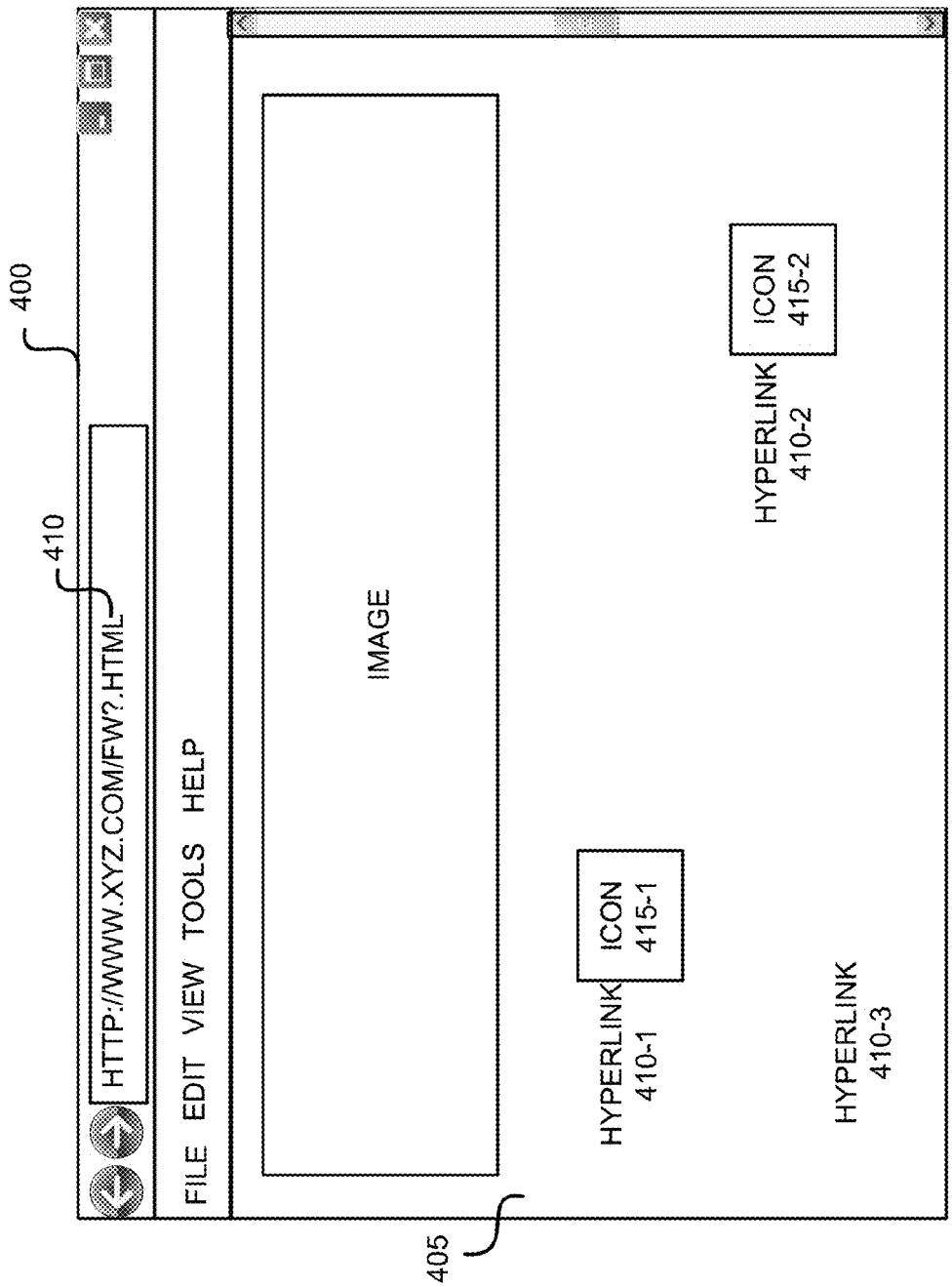
FIG. 4C is a diagram illustrating an exemplary web page within a web browser.

For example, referring to FIG. 4C, end device 102 displays an on-ramp web page 405 via a web browser 400. On-ramp web page 405 has a URL 410. On-ramp web page 405 includes hyperlinks 410-1 through 410-3. Hyperlinks 410-1 and 410-2 correspond to replacement hyperlink URLs that have been validated. Additionally, icons 415-1 and 415-2 are located proximate to hyperlinks 410-1 and 410-2 to indicate that the toll-free data service is supported and active for these hyperlinks. Hyperlink 410-3 may be a hyperlink URL that is not currently active for the toll-free data service.

Referring back to FIG. 4B, in step 11, assume that user 104 clicks on a replacement URL and causes an HTTP request to be transmitted from end device 102 to content provider device 122. In step 12, the web browser of end device 102 downloads and parses a sponsored web page. In step 13, in response to the parsing event, logger 103 scans the sponsored web page. Based on the scanning of the sponsored web page, logger 103 determines whether any URLs (e.g., hyperlink URLs) included in the sponsored web page are unsigned. According to this example, assume that logger 103 determines that multiple hyperlink URLs are unsigned within the sponsored web page.

Figure 4D:
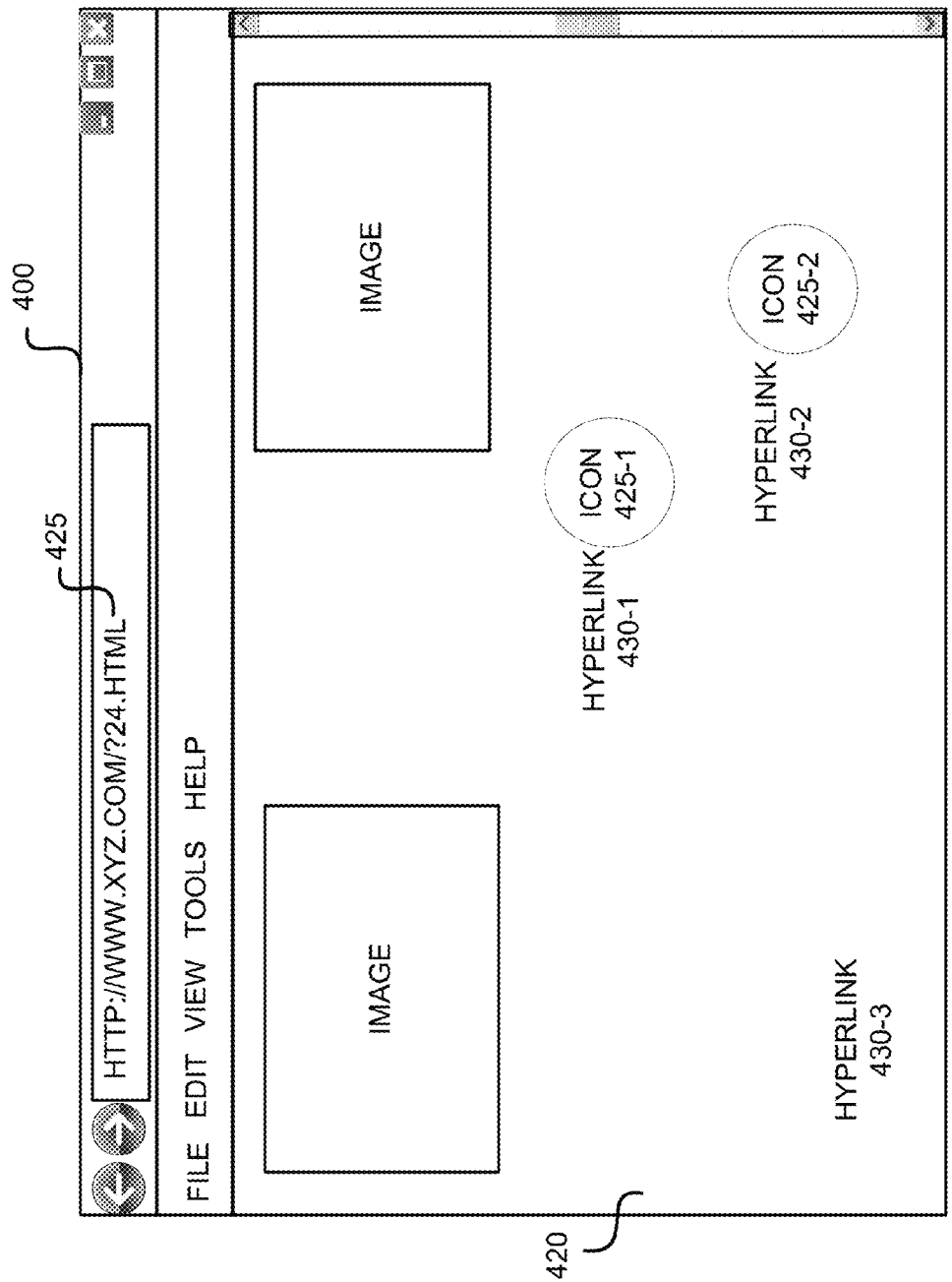
FIG. 4D is a diagram illustrating another exemplary web page within a web browser.

By way of further example, referring to FIG. 4D, end device 102 displays a sponsored web page 420 via web browser 400. Sponsored web page 420 has a URL 425. Additionally, sponsored web page 420 includes hyperlinks 430-1 through 430-3. Hyperlinks 430-1 and 430-2 correspond to the unsigned hyperlink URLs.

Referring back to FIG. 4B, in step 14, logger 103 collects and stores the unsigned URLs. In step 15, logger 103 generates a report that includes blacklist data. For example, the blacklist data may include a log identifier, the unsigned URLs (e.g., hyperlinks 430-1 and 430-2), and the URL of the sponsored web page (e.g., URL 425). Logger 103 transmits the report to logging device 124. For example, logger 103 may transmit an HTTP(S) POST message that includes the report. In step 16, in response to receiving the report, logging device 124 stores the blacklist data. In step 17, logging device 124 generates and transmits an investigative request to sponsored device 128. The investigative request includes the blacklist data and a request to investigate the unsigned URL data. Although not illustrated, the sponsor or a network device (e.g., sponsored device 128, a backend system associated with the sponsor, etc.) may process the investigative request to determine whether the unsigned URL data is suppose to be unsigned or a correction needs to be made. In step 18, in response to the investigative request, sponsored device 128 generates and transmits an investigative response to logging device 124. The investigative response may include data that indicates a result of the investigation. For example, the data may indicate that the unsigned URLs have been changed to signed URLs and the data may include replacement URLs. Alternatively, the data may indicate that the unsigned URLs are supposed to be unsigned and that the unsigned URLs have been removed from the sponsored web page. In step 19, in response to receiving the investigative response, logging device 124 updates the blacklist data based on the data included in the investigative response.

Although not illustrated, logging device 124 may transmit the investigative response to other backend systems (e.g., a billing system, a customer service center, etc.) so that any issues surrounding the logging event may be resolved (e.g., with respect to user 104, the sponsor, the content provider, etc.).

Although FIGS. 4A and 4B illustrate an exemplary process of the logging service, according to other embodiments, the process may include additional operations, fewer operations, and/or different operations than those illustrated in FIGS. 4A and 4B, and described herein. For example, in step 14, in response to determining the presence of unsigned URLs in the sponsored web page, logger 103 may cause an image (e.g., a NOT-Freebee icon) to be rendered within the sponsored web page to indicate that the URL is not supported by the toll-free data service. In this way, user 104 may be put on notice that the toll-free data service is not active or available for this particular URL. For example, referring back to FIG. 4D, icons 425-1 and 425-2 may correspond to the image (e.g., the NOT-Freebee icon).

FIG. 5 is a diagram illustrating exemplary components of a device 500 that may correspond to one or more of the devices in environments described herein. For example, device 500 may correspond to content provider device 122, logging device 124, validation device 126, end device 102, and other devices described herein. Additionally, exemplary elements of devices may be implemented based on the components described herein. As illustrated in FIG. 5, device 500 includes a bus 505, a processor 510, memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 515 may include a hard disk (e.g., a magnetic disk, an optical disk, a magneto-optic disk, a solid state disk, etc.) and a corresponding drive. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software 520, and/or instructions related to the operation of device 500.

Software 520 includes an application or a program that provides a function and/or a process. Software 520 may also include firmware, middleware, microcode, hardware description language (HDL), and/or other form of instruction. As an example, with reference to logging device 124, software 520 may include an application that, when executed by processor 510, provides the functions of the logging service, as described herein. Additionally, with reference to validation device 126, software 520 may include an application that, when executed by processor 510, provides the functions of a validation service. Similarly, with reference to end device 102, software 520 may include an application that, when executed by processor 510, provides the functions of the logging service.

Communication interface 525 permits device 500 to communicate with other devices, networks, systems, and/or the like. Communication interface 525 includes one or multiple wireless interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, etc.).

Input 530 permits an input into device 500. For example, input 530 may include a keyboard, a mouse, a display, a button, a switch, an input port, speech recognition logic, a microphone, a camera, and/or some other type of visual, auditory, tactile, etc., input component. Output 535 permits an output from device 500. For example, output 535 may include a speaker, a display, a light, an output port, and/or some other type of visual, auditory, tactile, etc., output component. According to some embodiments, input 530 and/or output 535 may be a device that is attachable to and removable from device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6A:
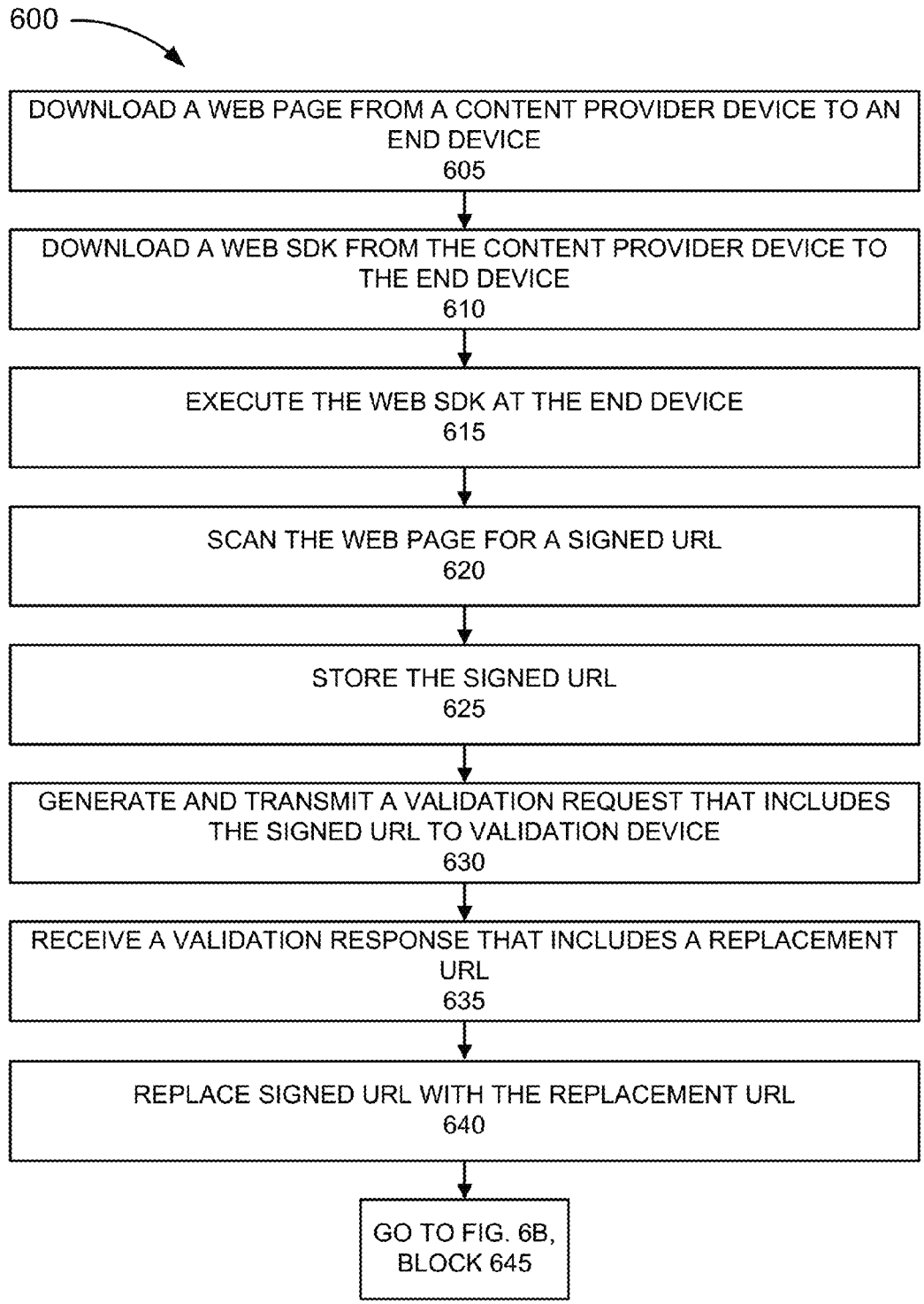
FIGS. 6A-6C are flow diagrams illustrating an exemplary process of the logging service performed by the end device.
Figure 6B:
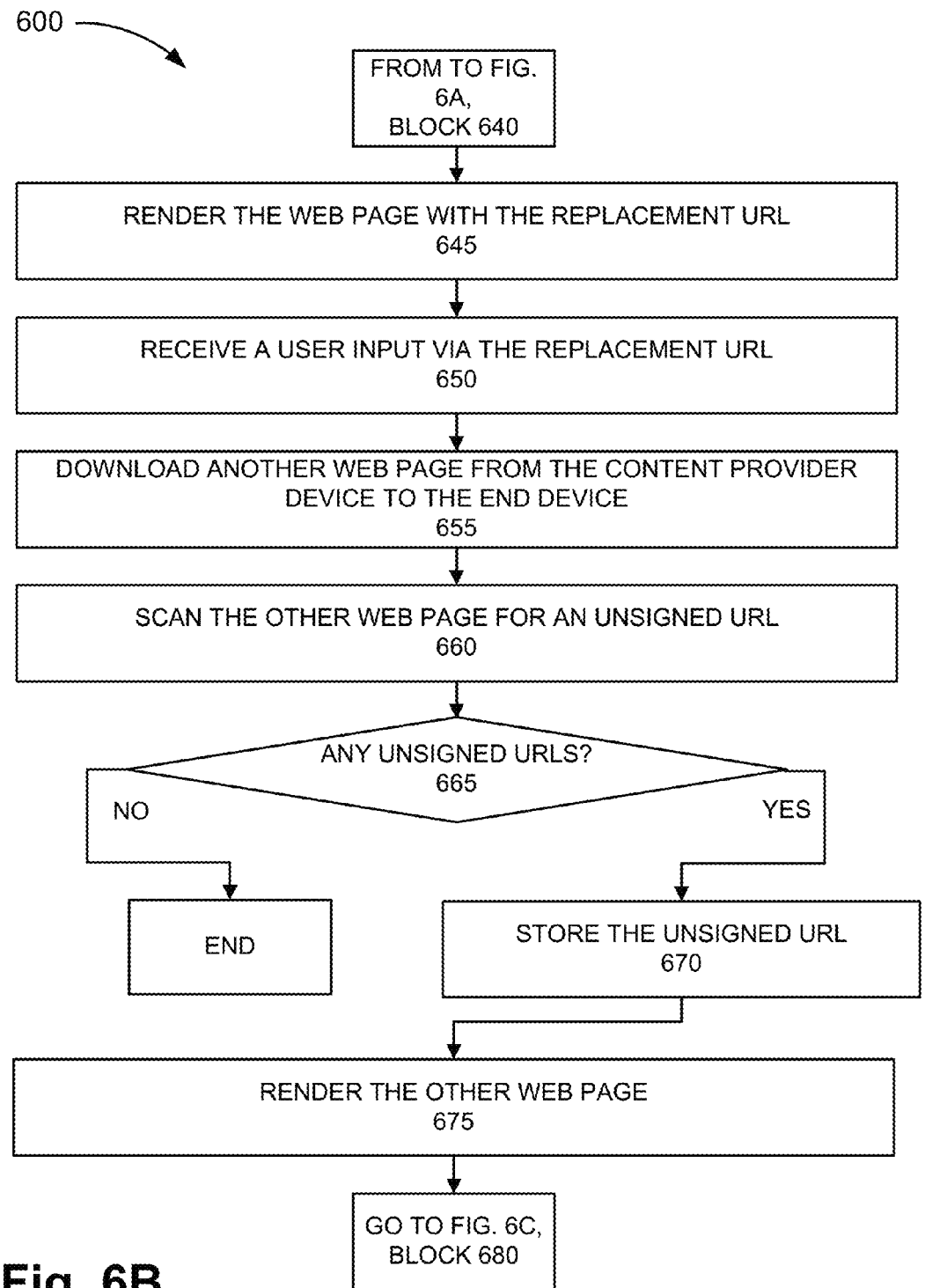
Figure 6C:
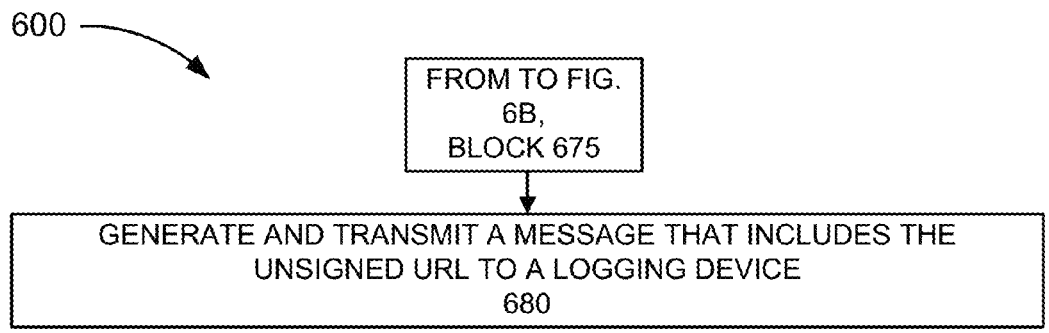

FIGS. 6A-6C are flow diagrams illustrating an exemplary process 600 pertaining to the logging service. Process 600 is directed to a process described with respect to FIGS. 2A, 4A, and 4B, as well as elsewhere in this description, in which end device 102 provides a logging service. For example, processor 510 executes software 520 to perform the steps illustrated in FIGS. 6A-6C and described.

Referring to FIG. 6A, process 600 may begin, in block 605, with downloading a web page from a content provider device to an end device. For example, user 104 via end device 102 and a web browser communicates with content provider device 122. User 104 navigates to an on-ramp web page causing an HTTP request to be transmitted via end device 102 to content provider device 122. Based on the HTTP request, end device 102 via the web browser begins downloading the on-ramp web page.

In block 610, a Web SDK is downloaded. For example, end device 102 via the web browser downloads the Web SDK. The Web SDK may be downloaded from content provider device 122 or another network device. As previously described, according to an exemplary implementation, the on-ramp web page includes an HTML element that causes the web browser to download the Web SDK.

In block 615, the Web SDK executes. For example, subsequent to the downloading of the Web SDK, the Web SDK executes at end device 102. In block 620, the web page is scanned for a signed URL. For example, in response to the loading of the on-ramp web page at end device 102, the Web SDK scans the on-ramp web page for any signed URLs included in the on-ramp web page. As previously described, the Web SDK may determine whether any hyperlink URLs include a string indicative of a signature.

In block 625, the signed URL is stored. For example, when the Web SDK determines the presence of a signed URL, the Web SDK stores the signed URL.

In block 630, a message that includes the signed URL is generated and transmitted. For example, the Web SDK generates a validation request that includes the signed URL. The Web SDK transmits the message to validation device 126.

In block 635, a message is received in response to the transmitted message. For example, the Web SDK receives a validation response, which includes a replacement URL, from validation device 126. The replacement URL may be the URL to a sponsored web page.

In block 640, the signed URL is replaced with the replacement URL. For example, the Web SDK replaces the signed URL with the replacement URL and, referring to FIG. 6B, in block 645, the web page is rendered with the replacement URL. For example, end device 102 and the web browser render the web page with the replacement URL.

In block 650, a user input is received via the replacement URL. For example, end device 102 via the web browser receives a user input from user 104 to request another web page via the replacement URL.

In block 655, the other web page is downloaded from the content provider device. For example, in response to receiving the user input, end device 102 via the web browser downloads the sponsored web page.

In block 660, the other web page is scanned for an unsigned URL. For example, in response to the loading of the other web page at end device 102, the Web SDK scans the sponsored web page for any unsigned URLs included in the sponsored web page. For example, the Web SDK may determine whether any hyperlink URLs do not include a string indicative of a signature. As previously described, within the sponsored web page, all of the embedded resources (e.g., hyperlink URLs) should be signed.

In block 665, it is determined whether any of the URLs are not signed. For example, the Web SDK determines whether there are any embedded URLs (e.g., hyperlink URLs) in the sponsored web page that is not signed. When it is determined that all of the URLs are signed (block 665-NO), process 600 may end. For example, when each URL is signed (assuming a URL link is present within the sponsored web page), the sponsored web page is fully supported by the toll-free data service. Depending on the use case, user 104 may continue to navigate through multiple sponsored web pages via this sponsored web page, in which case process 600 may loop through blocks 655 through 665 and determine whether any unsigned URLs are present. When it is determined that the sponsored web page includes an unsigned URLs (block 665-YES), the unsigned URL is stored (block 670). For example, the Web SDK stores the unsigned URL.

In block 675, the other web page is rendered. For example, end device 102 via the web browser renders the sponsored web page. Referring to FIG. 6C, in block 680, a message that includes the unsigned URL is generated and transmitted to a logging device. For example, the Web SDK generates a report that includes blacklist data. As previously described, the blacklist data may include a log identifier, the unsigned URL, and the URL of the sponsored web page. The Web SDK transmits the report in a message (e.g., an HTTP(S) POST) to logging device 124.

Although FIGS. 6A-6C illustrate an exemplary process 600 of the logging service, according to other embodiments, process 600 may include additional operations, fewer operations, and/or different operations than those illustrated in FIG. 6 and described herein. For example, in block 675, the Web SDK may also cause an image to render that indicates that the unsigned URL is not toll-free. In this way, user 104 may decide not to select the unsigned URL within the sponsored web page.

Additionally, as previously described, process 600 may continue from the logging device perspective in which the blacklist data is stored. Additionally, the logging device may initiate further investigation of the issue by forwarding the blacklist data to a sponsored device. Based on the response from the sponsored device, the logging device may notify various backend systems.

The foregoing description of embodiments provides illustration, but is not intended to be exhaustive or to limit the embodiments to the precise form disclosed. Accordingly, modifications to the embodiments described herein may be possible The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks has been described with regard to the process illustrated in FIGS. 6A-6C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 510, etc.), or a combination of hardware and software (e.g., software 520). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 510) of a computational device. A non-transitory storage medium includes one or more of the storage mediums described in relation to memory/storage 515.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
    loading, by an end device, a first web page hosted at a content provider device;
    scanning, by the end device and in response to the loading, each embedded uniform resource locator (URL) of the first web page;
    selecting, by the end device and in response to the scanning, each embedded uniform resource locator (URL) of the first web page that is signed, wherein each signed embedded URL includes a particular string that indicates support of a toll-free data service;
    transmitting, by the end device and to a first network device, each signed embedded URL;
    receiving, by the end device and from the first network device, at least one replacement URL, wherein the at least one replacement URL is different from its corresponding at least one signed embedded URL;
    rendering, by the end device, the first web page, wherein the rendering includes using the at least one replacement URL;
    receiving, by the end device, a user input via one of the at least one replacement URL;
    loading, by the end device, a second web page in response to receiving the user input;
    scanning, by the end device and in response to the loading of the second web page, for an embedded URL of the second web page;
    determining, by the end device and in response to the scanning of the second web page, whether the second web page includes at least one unsigned embedded URL; and
    transmitting, by the end device and to a second network device, blacklist data in response to determining that the second web page includes the at least one unsigned embedded URL, wherein the blacklist data includes the at least one unsigned embedded URL and the at least one unsigned embedded URL does not include the particular string.

2. The method of claim 1, further comprising:
    storing, by the end device, the particular string;
    comparing, by the end device, the particular string to each embedded URL of the first web page; and
    determining, by the end device, whether each embedded URL of the first web page includes the particular string based on the comparing.

3. The method of claim 1, further comprising:
    storing, by the end device, the particular string, and wherein the determining comprises:
        comparing, by the end device, the particular string to each embedded URL of the second web page; and
        determining, by the end device, whether at least one unsigned embedded URL is included in the second web page based on the comparing.

4. The method of claim 1, further comprising:
    rendering, by the end device, the second web page with the at least one unsigned embedded URL and an image indicating that the at least one unsigned embedded URL is not supported by the toll-free data service in response to determining that the at least one unsigned embedded URL is included in the second web page.

5. The method of claim 1, wherein the rendering of the first web page comprises:
    rendering, by the end device, the first web page with the at least one replacement URL and an image indicating that the at least one replacement URL is supported by the toll-free data service.

6. The method of claim 1, wherein the blacklist data includes a URL for the second web page, and wherein the first web page is not supported by the toll-free data service and the second web page is supported by the toll-free data service.

7. The method of claim 1, further comprising:
    receiving, by the second network device, the blacklist data;
    storing, by the second network device, the blacklist data; and
    transmitting, by the second network device and to a third network device, a first message that includes the blacklist data and a request to investigate why the at least one unsigned embedded URL of the second web page is not signed, wherein the third network device is associated with an entity that sponsors the toll-free data service.

8. The method of claim 7, further comprising:
    receiving, by the second network device, a second message in response to the first message, wherein the second message includes data indicating that the at least one unsigned embedded URL is now signed or that the least one unsigned embedded URL is to remain unsigned;
    analyzing, by the second network device, the second message; and
    updating, by the second network device, the blacklist data in response to the analyzing and the data included in the second message.

9. A system comprising:
    an end device comprising:
        a first communication interface;
        a first memory, wherein the first memory stores first instructions; and
        a first processor, wherein the first processor executes the first instructions to:
            load a first web page hosted at a content provider device;
            scan, in response to the loading, each embedded uniform resource locator (URL) of the first web page;

select, in response to the scanning, each embedded uniform resource locator (URL) of the first web page that is signed, wherein each signed embedded URL includes a particular string that indicates support of a toll-free data service;

transmit, via the first communication interface and to a first network device, each signed embedded URL;

receive, via the first communication interface and from the first network device, at least one replacement URL, wherein the at least one replacement URL is different from its corresponding at least one signed embedded URL;

render the first web page, wherein the rendering includes using the at least one replacement URL;

receive a user input via one of the at least one replacement URL;

load a second web page in response to receiving the user input;

scan, in response to the loading of the second web page, for an embedded URL of the second web page;

determine, in response to the scanning of the second web page, whether the second web page includes at least one unsigned embedded URL; and transmit, via the first communication interface and to a second network device, blacklist data in response to a determination that the second web page includes the at least one unsigned embedded URL, wherein the blacklist data includes the at least one unsigned embedded URL and the at least one unsigned embedded URL does not include the particular string.

10. The system of claim 9, wherein the first processor further executes the first instructions to:
store the particular string;
compare the particular string to each embedded URL of the first web page; and
determine whether each embedded URL of the first web page includes the particular string based on the comparison.

11. The system of claim 9, wherein the first processor further executes the first instructions to:
store the particular string, and wherein when determining, the first processor further executes the first instructions to:
compare the particular string to each embedded URL of the second web page; and
determine whether at least one unsigned embedded URL is included in the second web page based on the comparison.

12. The system of claim 9, wherein the first processor further executes the first instructions to:
render the second web page with the at least one unsigned embedded URL and an image indicating that the at least one unsigned embedded URL is not supported by the toll-free data service in response to the determination that the at least one unsigned embedded URL is included in the second web page.

13. The system of claim 9, wherein when rendering the first web page, the first processor further executes the first instructions to:
render the first web page with the at least one replacement URL and an image indicating that the at least one replacement URL is supported by the toll-free data service.

14. The system of claim 9, wherein the first web page is not supported by the toll-free data service and the second web page is supported by the toll-free data service.

15. The system of claim 9, further comprising:
the second network device comprising:
a second communication interface;
a second memory, wherein the second memory stores second instructions; and
a second processor, wherein the second processor executes the second instructions to:
receive, via the second communication interface and from the first network device, the blacklist data;
store the blacklist data in response to the receipt of the blacklist data;
transmit, via the second communication interface and to a third network device, a first message that includes the blacklist data and a request to investigate why the at least one unsigned embedded URL of the second web page is not signed, wherein the third network device is associated with an entity that sponsors the toll-free data service.
receive, via the second communication interface and from the third network device, a second message in response to the first message, wherein the second message includes data indicating that the at least one unsigned embedded URL is now signed or that the least one unsigned embedded URL is to remain unsigned;
analyze the second message; and
update the blacklist data in response to the analysis and the data included in the second message.

16. A non-transitory, computer-readable storage medium storing instructions executable by a processor of a computational device, which when executed cause the computational device to:
load a first web page hosted at a content provider device;
scan, in response to the loading, each embedded uniform resource locator (URL) of the first web page;
select, in response to the scanning, each embedded uniform resource locator (URL) of the first web page that is signed, wherein each signed embedded URL includes a particular string that indicates support of a toll-free data service;
transmit each signed embedded URL to a first network device;
receive, from the first network device, at least one replacement URL, wherein the at least one replacement URL is different from its corresponding at least one signed embedded URL;
render the first web page, wherein the rendering includes using the at least one replacement URL;
receive a user input via one of the at least one replacement URL;
load a second web page in response to receiving the user input;
scan, in response to the loading of the second web page, for an embedded URL of the second web page;
determine, in response to the scanning of the second web page, whether the second web page includes at least one unsigned embedded URL; and
transmit to a second network device, blacklist data in response to a determination that the second web page includes the at least one unsigned embedded URL, wherein the blacklist data includes the at least one unsigned embedded URL and the at least one unsigned embedded URL does not include the particular string.

17. The non-transitory, computer-readable storage medium of claim 16, further storing the instructions to:
   store the particular string;
   compare the particular string to each embedded URL of the first web page; and
   determine whether each embedded URL of the first web page includes the particular string based on the comparison.

18. The non-transitory, computer-readable storage medium of claim 17, further storing instructions to:
   store the particular string, and wherein the instructions to determine further comprise instructions to:
     compare the particular string to each embedded URL of the second web page; and
     determine whether at least one unsigned embedded URL is included in the second web page based on the comparison.

19. The non-transitory, computer-readable storage medium of claim 17, wherein the first web page is an on-ramp web page to a sponsored web page supporting the toll-free data service, and the non-transitory, computer-readable storage medium further storing instructions to:
   identify the first web page as the on-ramp web page based on a HyperText Markup Language (HTML) Head Element that includes at least one of an include statement or an import statement and, a URL to download a Web Software Development Kit; and
   download the Web Software Development Kit in response to the identification that the first web page includes the HTML Head Element.

20. The non-transitory, computer-readable storage medium of claim 16, further storing instructions to:
   render the second web page with the at least one unsigned embedded URL and an image indicating that the at least one unsigned embedded URL is not supported by the toll-free data service in response to the determination that the at least one unsigned embedded URL is included in the second web page.

\* \* \* \* \*